Oct. 31, 1961

R. LASKER ET AL 3,006,800

METHOD OF FORMING A REINFORCED DOUBLE
SHEET OF CELLULOSE ACETATE
Filed March 12, 1957

INVENTORS
RICHARD LASKER AND CLYDE K.
BY  BILLEB

Mock & Blum
ATTORNEYS.

United States Patent Office 3,006,800
Patented Oct. 31, 1961

3,006,800
METHOD OF FORMING A REINFORCED DOUBLE SHEET OF CELLULOSE ACETATE
Richard Lasker, Scarsdale, N.Y., and Clyde K. Billeb, Shorewood, Wis., assignors to Milprint Incorporated, New York, N.Y., a corporation of Delaware
Filed Mar. 12, 1957, Ser. No. 645,464
1 Claim. (Cl. 156—299)

This invention relates to a new and improved reinforced, doubled sheet of cellulose acetate.

It is well known to print upon either the inner faces or outer faces of a doubled leaf of transparent cellulose acetate, for the purposes described in Lasker U.S. Patent No. 2,294,465, for "Printed Article," dated September 1, 1942.

As stated in said Lasker patent, the folded sheet has sections which have respective printed panels, said panels corresponding to different respective views of the same object.

The manufacture of books of such doubled sheets has been a large industry for many years.

In order to clearly view the printed matter in said panels, it is necessary that the inner faces of the doubled sheets should abut each other, without intervening, irregular air spaces.

Cellulose acetate becomes soft and pliable at about 250° F., and it is heated to a forming temperature of 250° F. to 275° F. in the process of making a transparent sheet of cellulose acetate. The temperature and time of heating must be carefully controlled in the process of making such sheet, or else the surface of the cellulose acetate sheet is marred. Hence it is impossible to directly heat-seal the inner faces of such a doubled sheet of transparent cellulose acetate to each other, because the temperature of heat sealing would mar the smooth printed faces of the thin and transparent cellulose acetate sheet, whose thickness may be about 0.0015 inch to 0.002 inch, namely, fifteen ten-thousandths of an inch to two-thousandths of an inch.

The prior doubled sheets of printed cellulose acetate have been mechanically weak, because such sheets are connected to each other only at their respective vertical fold lines, and the free vertical edges of such sheets have easily torn, when such doubled sheets were bound by staples or otherwise into book form.

Also, since such sheets, when bound in book form, are not connected to each other at their top and bottom horizontal edges, it is possible for children to tamper with these sheets, and for dust and dirt to enter between the adjacent inner faces of such doubled sheets.

According to this invention, it has been discovered that a thin ribbon or sheet of hot, plastic polyethylene is self-adherent to cellulose acetate, if the hot and plastic polyethylene is at a suitable temperature of substantially 400° F. to substantially 600° F. The polyethylene is of the usual commercial type.

It is well known to heat polyethylene particles or flakes until the said particles or flakes cohere to form a hot, plastic mass and to extrude such hot plastic material in tubular form. This is disclosed in Ferngren U.S. Patents No. 2,128,239 and No. 2,230,188.

According to one embodiment of this invention, the flat web of cellulose acetate is printed upon one face thereof, in the usual manner.

A hot and flat, plastic sheet of polyethylene, which is at a temperature of 400° F. to 600° F., is directly extruded upon the entire flat printed face of said cellulose acetate web. As above noted, the thickness of the cellulose acetate web is 0.0015 to 0.002 inch. The thickness of the coating sheet of polyethylene in the final coated web is 0.0005 inch to 0.001 inch. The web of cellulose acetate is at ordinary room temperature of about 70° F. when the hot, plastic coating sheet of polyethylene is applied. Under these conditions, the coating sheet of polyethylene immediately self-adheres with and unites with the printed web of cellulose acetate.

Immediately after the coating sheet of hot and plastic polyethylene contacts with the web of cellulose acetate, said two contacting sheets are subjected to pressure by passing them between cylindrical pressure rolls, which may be at a temperature of 60° to 100° F. One of these pressure rolls, which may contact with either of said sheets, is a rigid metal roll of good conductivity. The other pressure roll may have a sleeve of resilient and compressible vulcanized rubber. Immediately after being thus pressed, the coating layer of polyethylene is at a temperature not exceeding 225° F. The width of the coating layer of hot and plastic polyethylene may be equal to or substantially equal to the width of the cellulose acetate sheet or web. The pressure of said pressure rolls does not substantially increase the original width of the hot, plastic coating sheet or web of polyethylene. The pressure of said pressure rolls may be 100 to 200 pounds per square inch.

Said pressure rolls firmly unite the two films or sheets or webs of polyethylene and cellulose acetate. The heat of the hot, plastic polyethylene does not mar the thin sheet of cellulose acetate, because the thickness of the hot and plastic coating film of polyethylene is slight, only above five ten-thousandths of an inch to one-thousandth of an inch.

After the two webs have been firmly united by pressure, the combined webs are passed over a cooling drum where the combined webs are cooled to about 70° F.

In commercial practice according to this invention, the cooled combined webs are wound into a roll, which is transferred to mechanism for heat sealing under pressure, and for folding and cutting the folded web laterally into doubled leaves.

The combined web is folded along a longitudinal axial, median line, so that the two layers of polyethylene coating contact with each other. These two layers of polyethylene are heat sealed under pressure to each other, either only at their edges, or at their entire abutting areas. Air is excluded between said contacting layers by pressure.

After said folding and heat-sealing operations, the combined web is cut transversely into cut sections.

Each cut section consists of two outer layers of cellulose acetate and two inner layers of polyethylene. Each outer layer of cellulose acetate is heat sealed to a respective inner layer of polyethylene. The two inner and abutting layers of polyethylene are heat sealed to each other by the usual apparatus. If said cut section is of usual square or rectangular shape, the inner layers of polyethylene may be heat sealed to each other only at the four edges of the polyethylene layers of such section, or along the entire area of the polyethylene layers of such cut section. In either case, the two inner layers of polyethylene abut each other.

The invention is further explained below.

Figure 1:
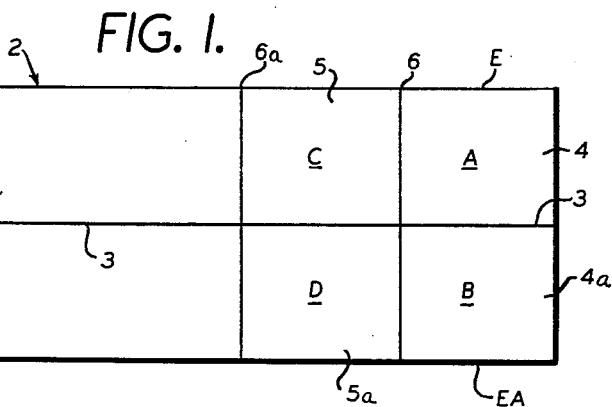
FIG. 1 is a top plan view of the previously printed web of cellulose acetate to which the hot and plastic and extruded ribbon or web of polyethylene is directly applied.

The web 2 of printed cellulose acetate has a longitudinal median axis 3. Said web 2 has a single printed face, which has laterally associated pairs of panels 4, 4a, 5, 5a and so forth. The companion panels 4 and 4a of each pair have pictorial matter or other printed matter marked A and B. These printed pictures correspond to a respective pair of companion pictures, as illustrated in said Lasker Patent No. 2,294,465.

The next pair of companion panels 5 and 5a also have a respective pair of pictures C and D. The entire pre-printed web 2 has such laterally associated pairs of panels along its entire length.

In prior practice, the printed and transparent web 2 of cellulose acetate has been fed in the axial direction indicated by arrow 3a through folding mechanism which folded said web 2 laterally along its axis 3, and the folded web 2 has then been cut along the lateral lines 6, 6a and so forth, to provide respective folded leaves, the respective folded leaves having equal and superposed panels 4—4a, 5—5a and so forth, each said leaf having a fold line at axis 3.

Figure 2:
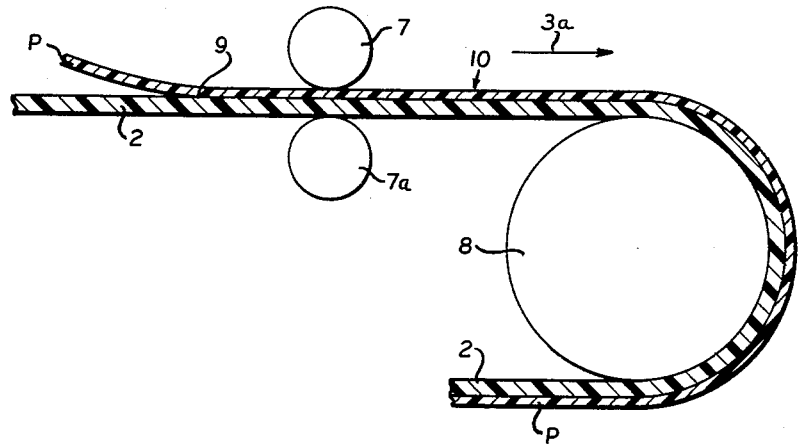
FIG. 2 is a side schematic view of the set-up used in feeding and attaching the hot ribbon of polyethylene to the web of cellulose acetate in forming a composite web.

As shown in FIG. 2, while the pre-printed and uncut cellulose acetate web 2 is moved at constant longitudinal speed in the direction of arrow 3a, a hot, extruded, transparent, plastic coating layer P of polyethylene is applied directly to the flat and horizontal and printed face of web 2 at the lateral line 9. The width of the extruded transparent polyethylene layer P is equal or substantially equal to the width of the transparent web 2. As one example, the pre-printed web 2 is fed longitudinally at the rate of up to 300 feet per minute in this coating operation, the thickness of the transparent and horizontal and flat web 2 is .0015 to .002 inch, and the thickness of the transparent and flat polyethylene web or ribbon P is .0005 to .001 inch and its width is dependent on the size of the book page. As above noted, the temperature of the extruded and directly applied coating polyethylene layer P is substantially 400° F. to 600° F. at the lateral line of application 9, and the temperature of the cellulose acetate sheet 2 is about 70° F. at said line 9 when the hot and extruded polyethylene layer P is directly applied. Said line 9 is perpendicular to the axis 3 of the horizontal web 2.

The rolls 7 and 7a act as draw rolls. In this example, the rolls 7 and 7a are made of rubber and metal respectively, and they are kept at a temperature of 60° to 100° F., and they exert a pressure of 100 to 200 pounds per square inch.

In this example, the longitudinal distance between line 9 and the nip of rolls 7 and 7a is approximately two inches. Hence, since the web 2 and film P are fed at the rate of 300 feet per minute or five feet per second, there is a very short period of about one-thirtieth of a second between the application of film P and its cooling to 225° F. or less.

At the point 10, which is at a longitudinal distance of two feet from the nip of rolls 7 and 7a, the temperature of the coating layer P is about 150° F. This distance of two feet corresponds to about two-fifths of a second.

The composite web is led around a cooling or "curing" roll 8, which is made of metal, and has a diameter of 12 to 24 inches, said curing roll 8 being rotated in unison with the composite web 2–P. The composite web 2–P is thus cooled to 70° F.

Figure 3:
FIG. 3 is a sectional view of the folded composite web.

The composite web 2–P is then folded along its longitudinal axis 3 at 70° F., to provide two outer layers of the cellulose acetate web 2, and two inner layers P, as shown in FIG. 3.

These four layers contact with each other.

As the result of this folding at the axial line 3, the longitudinal edges E and EA of the transparent web 2, and the corresponding longitudinal edges of the transparent layers P, are now in vertical registration.

After this folding operation has been completed, the two inner layers P are heat-sealed to each other under pressure by conventional equipment. Such heat-sealing may be only at the edges E and EA, or across the entire width of the folded web, between the fold-line 3 and each of the edges E and EA.

Air is squeezed out between the adjacent transparent layers P, either before the heat-sealing operation or during the heat-sealing operation, so that the transparent layers P are firmly united without any intervening air. The heat-sealing may be done by heated sealing flanges which are fixed to a pair of revolving drums, or the heat-sealing may be by a pair of heated metal pressure drums, which are rotated in unison with the horizontal folded web, while said folded web is longitudinally fed in the direction of arrow 3a. The heat-sealing temperature may be 225° F. to 250° F.

The heat-sealing period may be short, as about one tenth of one second while the folded composite web is fed longitudinally at the rate of up to 150 feet per minute. The folded web is not marred by the heat-sealing, so that the entire folded web is clear and transparent.

The finished web is then cut along the successive lateral lines 6, 6 etc., to provide respective folded leaves.

Hence the folded leaf 4—4a has its panels 4 and 4a integral at the fold line 3, and the polyethylene layers P of said panels 4 and 4a may be heat-sealed to each other only at the edges E and EA, or only at said edges E and EA and at the cutting line 6, or at the entire abutting areas of said polyethylene layers P.

The scope of the invention is stated in the annexed claim.

We claim:

A method of forming a leaf of superposed, heat-sealed layers of transparent, heat-marrable cellulose acetate sheets, which comprises moving a web of transparent, heat-marrable cellulose acetate, which has a longitudinal axis, forwardly in the direction of said axis at constant, forward, longitudinal speed through a pressure-applying zone, directly applying a hot, solid, transparent and self-sustaining film of polyethylene to a selected flat face of said web along a contact line of said selected flat face of said web which is lateral to said longitudinal axis and which is anterior to said pressure-applying zone, maintaining the temperature of said film at substantially 400° Fahrenheit to 600° Fahrenheit at said contact line, maintaining the temperature of said web at substantially 70° Fahrenheit at said contact line, moving said film in unison with said web and in contact with said selected face beyond said contact line and through said pressure-applying zone, pressing said film and said web against each other in said pressure-applying zone at said selected face to self-adhere said film and said web against each other at said selected face, maintaining the temperature of said pressure-applying zone at substantially 60° Fahrenheit to 100° Fahrenheit to cool said applied film within said pressure zone and cooling said film to a maximum of substantially 150° Fahrenheit close to the exit end of said pressure-applying zone, moving said web and said film at sufficient speed forwardly to provide a period of only a fraction of a second for the movement of said film and said web from said contact line through said pressure-applying zone, superposing selected web portions with the exposed surfaces of the polyethylene film layers thereof in contact with each other, and heat sealing said exposed surfaces to each other at a heat-sealing temperature of substantially 225° Fahrenheit to 250° Fahrenheit during a heat-sealing period of a fraction of a second, thus avoiding the heat-marring of said cellulose acetate.

(References on following page)

References Cited in the file of this patent

UNITED STATES PATENTS

| | | |
|---|---|---|
| 1,992,249 | Snyder | Feb. 26, 1935 |
| 2,294,465 | Lasker | Sept. 1, 1942 |
| 2,462,331 | Myers | Feb. 22, 1949 |
| 2,554,157 | Snyder | May 22, 1951 |
| 2,628,172 | Jenett | Feb. 10, 1953 |
| 2,675,339 | Zenftman | Apr. 13, 1954 |
| 2,679,968 | Richter | June 1, 1954 |
| 2,679,969 | Richter | June 1, 1954 |
| 2,714,571 | Irion et al. | Aug. 2, 1955 |
| 2,728,439 | Murphy et al. | Dec. 27, 1955 |
| 2,734,289 | Heaton et al. | Feb. 14, 1956 |

FOREIGN PATENTS

| | | |
|---|---|---|
| 601,713 | Great Britain | May 11, 1948 |

OTHER REFERENCES

Modern Plastics, "Precocious Plastic," February 1948, vol. 25, pages 73–80, 206, material.